United States Patent
Jeong et al.

(10) Patent No.: US 6,903,735 B2
(45) Date of Patent: Jun. 7, 2005

(54) APPARATUS FOR SYNTHESIZING MULTIVIEW IMAGE USING TWO IMAGES OF STEREO CAMERA AND DEPTH MAP

(75) Inventors: Hong Jeong, Pohang (KR); Yuns Oh, Pohang (KR)

(73) Assignee: Pohang University of Science and Technology Foundation, Kyungsangbuk-do (KR)

(*) Notice: Subject to any disclaimer, the term of this patent is extended or adjusted under 35 U.S.C. 154(b) by 313 days.

(21) Appl. No.: 10/294,681

(22) Filed: Nov. 15, 2002

(65) Prior Publication Data

US 2003/0095119 A1 May 22, 2003

(30) Foreign Application Priority Data

Nov. 17, 2001 (KR) .................................. 2001-0071586

(51) Int. Cl.⁷ ................................................ G06T 3/00
(52) U.S. Cl. ........................ 345/418; 348/47; 348/51; 348/52
(58) Field of Search .............................. 348/47, 51, 52; 345/418

(56) References Cited

U.S. PATENT DOCUMENTS

| | | | | |
|---|---|---|---|---|
| 5,424,773 A | * | 6/1995 | Saito | 348/218.1 |
| 5,444,478 A | * | 8/1995 | Lelong et al. | 348/39 |
| 6,233,004 B1 | * | 5/2001 | Tanaka et al. | 348/48 |
| 6,366,281 B1 | * | 4/2002 | Lipton et al. | 345/419 |
| 6,791,540 B1 | * | 9/2004 | Baumberg | 345/419 |

* cited by examiner

Primary Examiner—Richard Hjerpe
Assistant Examiner—Daniel Hajnik
(74) Attorney, Agent, or Firm—Rothwell, Figg, Ernst & Manbeck, P.C.

(57) ABSTRACT

A multiview image synthesizing apparatus using a depth map of a stereo camera includes a multiview image synthesizing unit for converting an image signal input from first and second cameras to a digital signal and outputting a value of a depth map at a position of a virtual camera located at an arbitrary position between the first and second cameras, a multiview image re-projection unit for calculating a mapping pixel index of a multiview re-projection image for the virtual camera set by a user, by receiving the digital signal transmitted from the multiview image synthesizing unit, and outputting the calculated mapping pixel index, and a pixel selection unit for selecting a predetermined pixel to display an overlapping pixel of the digital signal input through the multiview image synthesizing unit, by using an output signal output from the multiview image re-projection unit. Thus, an image of a virtual camera set by a user is produced in real time by using a stereo image sequence using the serial processing step of a depth map and the recurrence algorithm.

10 Claims, 2 Drawing Sheets

APPARATUS FOR SYNTHESIZING MULTIVIEW IMAGE USING TWO IMAGES OF STEREO CAMERA AND DEPTH MAP

BACKGROUND OF THE INVENTION

1. Field of the Invention

The present invention relates to an apparatus for synthesizing a multiview image using two images from a stereo camera and a depth map, and more particularly, to an apparatus for synthesizing a multiview image using two images from a stereo camera and a depth map in which, video images obtained from a pair of cameras are processed in real time and a video image obtained from a virtual camera between the pair of cameras is generated.

2. Description of the Related Art

In the field of visualization or imaging for entertainment, it is often desirable to view a scene from an arbitrary position. To obtain the desired image, one can imagine a system which uses many cameras installed at all the required positions or mobile cameras. However, such system may prove to be impractical or too expensive especially if many positions are required.

One method to overcome this problem is to place cameras at a few strategic fixed locations, and to generate new video images of the scene as viewed from a new virtual camera located somewhere between the real cameras. The virtual camera video image must be generated by combining the data from the real cameras. This process is quite difficult, especially when we consider that video images must be processed at about 30 frames per seconds

SUMMARY OF THE INVENTION

To solve the above-described problems, it is an object of the present invention to provide an apparatus for synthesizing a multiview image using two images from a pair of cameras and a depth map which can produce, in real-time, an image from a virtual camera located somewhere between the two original cameras.

To achieve the above object, there is provided a multiview image synthesizing apparatus using a depth map of a stereo camera includes a multiview image synthesizing unit for converting the image signals input from first and second cameras to digital signals and outputting a value of a depth map at a position of a virtual camera located in a position between the first and second cameras, a multiview image re-projection unit for calculating a mapping pixel index of a multiview re-projection image for the virtual camera set by a user by receiving the digital signal transmitted from the multiview image synthesizing unit and outputting the calculated mapping pixel index, and a pixel selection unit for selecting a predetermined pixel to display an overlapping pixel of the digital signal input through the multiview image synthesizing unit by using a signal output from the multiview image re-projection unit.

It is preferred in the present invention that the multiview image synthesizing unit converts the image signals input from the first and second cameras to digital signals and creates a depth map that contains three-dimensional reconstruction data in the form of disparity.

It is preferred in the present invention that the multiview image synthesizing unit comprises a storage portion for storing the digital image pixels of the digital signal converted from the image signal output from the first and second cameras, and a processing portion for outputting data of disparity by using the digital signal stored in the storage portion.

It is preferred in the present invention that the storage portion of the multiview image re-projection unit obtains and stores an updated index value by adding a value combined according to a predetermined equation to an index of a re-projection image pixel in the previous step by using two integer numbers to represent the position of a virtual camera on a virtual line between the first and second cameras.

It is preferred in the present invention that a depth map of the image signals output from the first and second cameras is used to obtain an image by the virtual camera located at an arbitrary position between the first and second cameras.

It is preferred in the present invention that the multiview image re-projection unit comprises a first control portion for outputting a predetermined control signal by receiving the digital signal transmitted from the multiview image synthesizing unit, a coding portion for converting the second input signal of the user to a positive or negative number according to a predetermined control signal of the first control portion, a first zero portion for converting the second input signal of the user coded by the coding portion to "0" according to a predetermined control signal of the first control portion, a shift register portion for converting the first input signal of the user to "½" according to a predetermined control signal of the first control portion, a second zero portion for converting a value output from the shift register portion to "0" according to a predetermined control signal of the first control portion, a first sum portion for adding a signal output from the second zero portion of the first input signal to a signal output from the first zero portion of the second input signal and outputting the added value as a difference value of a mapped re-projection image index, a second sum portion for adding the difference value of an index output from the first sum portion to an index of a re-projection image and outputting an updated index value, and a register portion for storing the updated index value output from the second sum portion.

It is preferred in the present invention that the multiview image re-projection unit uses a predetermined number (N) of left image pixels per scan line, a predetermined number (N) of right image pixels, a center-referenced depth map containing 2× predetermined number (N)+1 pixels, and an arbitrary virtual camera reference image containing (a user's first input signal (I)×predetermined number (N)+1) pixels.

It is preferred in the present invention that the pixel selection unit comprises a first pixel buffer portion for storing a predetermined number (N) of scan line pixels input from the first camera, a first pixel pointer portion for storing an index of the first pixel buffer portion where a left image pixel to be mapped is stored, a second pixel buffer portion for storing a predetermined number (N) scan line pixels input from the second camera, a second pixel pointer portion for storing an index of the second pixel buffer portion where a right image pixel to be mapped is stored, a second control portion for increasing an index of each of the first and second pixel pointer portions with respect to a difference value ($\Delta d_i$) of disparity which is input, and an output portion for outputting a pixel of an image of an arbitrary virtual camera.

It is preferred in the present invention that the output portion generates a pixel of a re-projection image by using the difference value ($\Delta d_i$) of disparity and a pixel that pixel pointers at the left and right side indicate.

It is preferred in the present invention that the first pixel buffer portion and the second pixel buffer portion are initialized when a pixel of a scan line is processed by the processing portion of the multiview image synthesizing unit.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
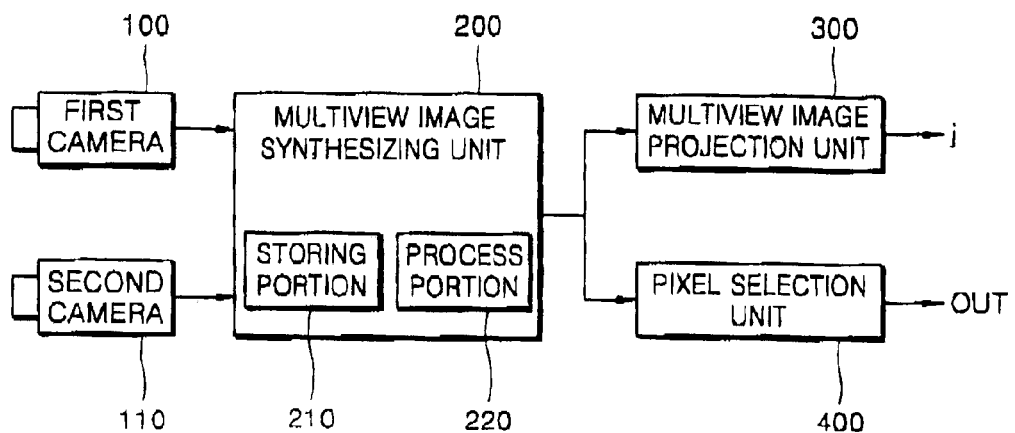
FIG. 1 is a block diagram showing the configuration of an apparatus for synthesizing a multiview image using two images of a stereo camera and a depth map according to the present invention.

Here, the same reference numerals indicate the same elements having the same structures and functions throughout the accompanying drawings.

Figure 2:
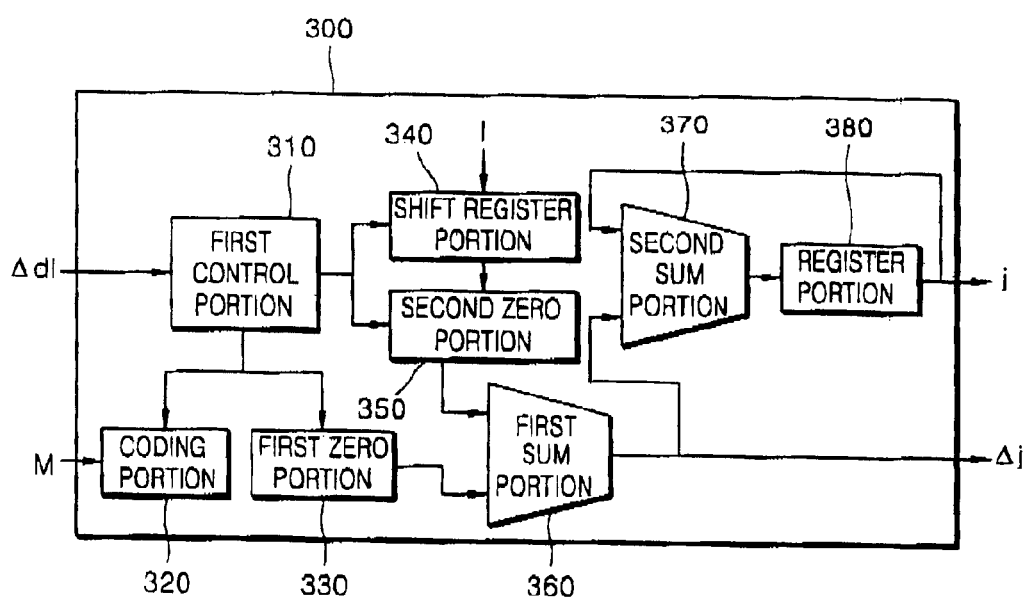
FIG. 2 is a block diagram showing the configuration of a multiview image re-projection unit shown in FIG. 1.
Figure 3:
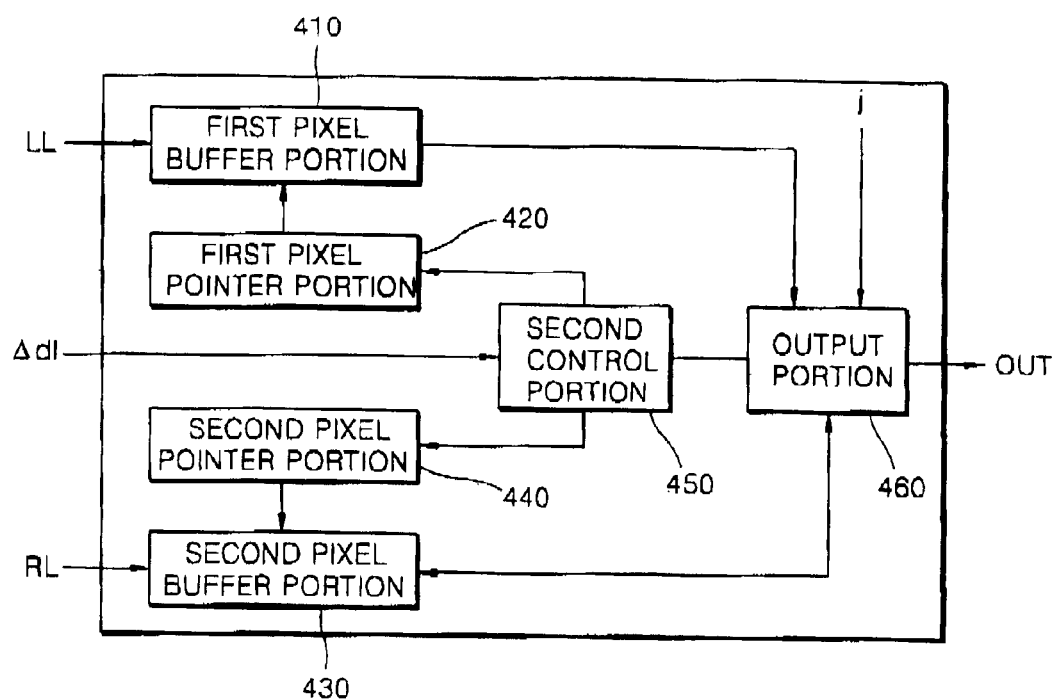
FIG. 3 is a block diagram showing the configuration of a pixel selection unit shown in FIG. 1.

Referring to FIGS. 1 through 3, the present invention includes a first camera 100, a second camera 110, a multiview image synthesizing unit 200, a multiview image re-projection unit 300, and a pixel selection unit 400.

The multiview image synthesizing unit 200 for converting image signals output from the first and second cameras 100 and 110 to a digital signal comprises a storage portion 210 for storing digital image pixels of a digital signal and a processing portion 220 for outputting data of a depth map by using the digital signal stored in the storage portion 210. Here, the digital signal converted in the multiview image synthesizing unit 200 is a depth map containing three-dimensional reconstruction data, in which a depth map of the image signal output from the first and second cameras 100 and 110 is used to obtain an image by a virtual camera located at an arbitrary position between the first and second cameras 100 and 110. Also, the storage portion 210 of the multiview image synthesizing unit 200 contains an updated index value obtained by adding a value combined according to a predetermined formula to an index of a re-projection image of the previous step by using a first user input signal I indicating the number of spaces obtained by equally dividing a virtual line between the first and second cameras 100 and 110 and a second input signal M which is an index indicating the location of the virtual camera along the equally divided points.

The multiview image re-projection unit 300 for receiving the digital signal transmitted from the multiview image synthesizing unit 200 and calculating and outputting a mapping pixel index of a re-projection image for a virtual camera, includes a first control portion 310 for receiving the digital signal transmitted from the multiview image synthesizing unit 200 and outputting a predetermined control signal, a coding portion 320 for changing the second input signal M into a positive or negative number according to a predetermined control signal, a first zero portion 330 for making the coded second input signal M of a user into "0" according to a predetermined control signal of the first control signal 310, a shift register portion 340 for changing the first input signal I of a user into ½ according to a predetermined control signal, a second zero portion 350 for making a signal output from the shift register portion 340 into "0" according to a predetermined signal of the first control signal 310, a first sum portion 360 for adding a signal output from the first zero portion 330 for the second input signal M to a signal output from the second zero portion 350 for the first input signal I and outputting a mapping index difference value of a re-projection image, a second sum portion 370 for adding an index of a re-projection image in the previous step to the difference value of an index output from the first sum portion 360 and outputting an updated index value, and a register portion 380 for storing the updated index value output from the second sum portion 370. Here, the multiview image re-projection unit 300 uses a left image pixel in a predetermined number N per scan line, a right image pixel in a predetermined number N per scan line, a center-referenced depth map pixel of 2×(predetermined number N)+1, and generates a virtual camera reference image pixel of (first user input signal I)×(predetermined number N)+1.

The pixel selection unit 400 selects a predetermined pixel to display an overlapping pixel of a digital signal input through the multiview image synthesizing unit 200 by using the signal output from the multiview image re-projection unit 300. The pixel selection unit 400 includes a first pixel buffer portion 410 for storing a predetermined number of scan line pixels received from the first camera 100, a first pixel pointer portion 420 for storing an index of the first pixel buffer portion 410 containing pixels for a left image to be mapped, a second pixel buffer portion 430 for storing a predetermined number of scan line pixels received from the second camera 110, a second pixel pointer portion 440 for storing an index of the second pixel buffer portion 430 containing pixels for a right image to be mapped, a second control portion 450 for increasing the index value of each of the first and second pixel pointer portions 420 and 440 with respect to a difference value $\Delta d_i$ of a depth map which is input, and an output portion 460 for outputting an image pixel of an arbitrary virtual camera. Here, the output portion 460 generates a re-projected pixel using a mapping index value of a re-projection image and a pixel generated from the pixels indicated by the left & right pixel pointers. The first and second pixel buffer portions 410 and 430 are initialized at the beginning of each scan line and output data to the processing portion 220 of the multiview image synthesizing unit 200.

In detail, to produce images obtained from a virtual camera located the first and second cameras 100 and 110, the virtual camera is assumed to be located on a line between the first camera 100 and the second camera 110. The line connecting the first camera 100 to the second camera 110 is divided into I equally sized partitions so that the location of the virtual camera lies on one of the partition boundaries. The index of the boundary on which the virtual camera lies is indicated by M where M=1 indicates the partition boundary closest to the left camera and M=I indicates the partition boundary closest to the right camera.

First, the images received from the first and second cameras 100 and 110 are stored in the storage portion 210 of the multiview image synthesizing unit 200. The image pixels of one scan line of the first camera 100 is expressed in vector form by Equation 1.

$$f^i_b = [f^i_a : a = 1 \ldots N] \qquad \text{[Equation 1]}$$

Here, "i" and "a" denote the left image and the index of a pixel for the left image from the left, respectively.

Also, the image pixels of one scan line of the second camera 110 is expressed in vector form by Equation 2.

$$f^r = [f^r_b : b = 1 \ldots N] \qquad \text{[Equation 2]}$$

Here, "r" and "b" denote the right image and pixel index for the right image from the left, respectively.

Images obtained from the first and second cameras 100 and 110 and having vectors of Equations 1 and 2 are converted to a depth map of a virtual camera image located at the center point between the first and second cameras 100 and 110. Here, the center-referenced depth map in use is stored as a depth map by converting an output value $d_i$ of disparity of the multiview image synthesizing unit 200 to a difference value $\Delta d_i$ of disparity for each pixel. That is, an output value of a depth map for a real-time reconstruction of a three-dimensional space with respect to a central pixel i is expressed as a difference value $\Delta d_i$ of disparity and has a value of +1, −1, and 0 for i=0 . . . 2N. Here, a vector of the depth map is expressed by Equation 3.

$$\Delta d = [\Delta d_i\ i=0\ \ldots\ 2N] \qquad \text{[Equation 3]}$$

Here, "i" denotes the index of a depth map pixel.

A re-projected virtual camera image has (IN+1) pixels for each scan line and each scan line of the re-projected image can be expressed by Equation 4 in vector form.

$$g = [g_j; j=0\ \ldots\ IN] \qquad \text{[Equation 4]}$$

Given any difference value $\Delta d_i$ of disparity, the index j of the corresponding pixel $g_j$ of the re-projected image is expressed by Equation 5.

$$j = \frac{I}{2}*i + \left(\frac{I}{2} - M\right)*\Delta d_i \qquad \text{[Equation 5]}$$

Given a difference value $\Delta d_i$ of disparity, the jump $\Delta_j$ to the next pixel $(g_j + \Delta_j)$ of the re-projected image is expressed by Equation 6.

$$\Delta j = \frac{I}{2} + \left(\frac{I}{2} - M\right)*\Delta d_i \qquad \text{[Equation 6]}$$

The depth map re-projection algorithm of a scan line pair performed in the multiview image re-projection unit 300 is realized as follows.

1. Initialization
i=0
j=0
2. Recurrence

An index value of a plane pixel for each image changes as follows according to the difference value $\Delta d_i$ of disparity which is input.

If $\Delta d_i$ is 0, then there are two cases.
If the value of $(i+d_i)$ is an odd number, $$\begin{cases} a = a + 1 \\ b = b + 1 \\ j = j + \frac{I}{2} \end{cases}.$$

Since the pixel of a re-projection image j has a relationship that $g_j = f_a^i = f_b^r$, the output portion 460 maps the a-th pixel of the right image or the b-th pixel of the left image to a pixel having an index of a multiview image projection pixel line that is j.

If the value of $(i+d_i)$ is an even number, then no processing is performed.

If $\Delta d_i$ is +1, $$\begin{cases} a = a \\ b = b + 2 \\ j = j + I - M \end{cases}.$$

The j-th pixel of a re-projection image has a relationship that $g_j = f_b^r$, and an image pixel having an index b of the right image is mapped to the j-th pixel.

If $\Delta d_i$ is −1, $$\begin{cases} a = a + 2 \\ b = b \\ j = j + M \end{cases}.$$

The j-th pixel of a re-projection image has a relationship that $g_j = f_a^i$, and an image pixel having an index a of the left image is mapped to the j-th pixel.

3. Termination
i=2N

The image pixel $g_j$ of a virtual camera is determined by mapping the left image pixel $f_a^i$ and the right image pixel $f_b^r$. When the difference value $\Delta d_i$ of disparity is 0, the left and right image pixels are mapped by applying weighted average according to the position of the virtual camera relative to the left and right cameras, $g_j = (M*f_a^i + (I-M)*f_b^r)/I$. When the difference value $\Delta d_i$ of disparity is +1, the right image pixel is mapped. When the difference value $\Delta d_i$ of disparity is −1, the left image pixel is mapped. Since the virtual camera image mapped as above has (IN+1) pixels, the size of the image increase by I times. Here, the re-projection image line of (IN+1) pixels has a form in which some pixels are blank. Thus, a virtual camera image of size N pixels is obtained by combining blocks of I consecutive pixels and replacing them with a single pixel that is the average of the I pixels.

In light of the above, the multiview image synthesizing apparatus using a depth map of a stereo camera according to the present invention has the following advantages.

By using a stereo image sequence using the serial processing step of a depth map and the recurrence algorithm, an image of a virtual camera set by a user can be produced in real time.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A multiview image synthesizing apparatus using a depth map of a stereo camera comprising:

a multiview image synthesizing unit for converting an image signal input from first and second cameras to a digital signal and outputting a value of a depth map at a position of a virtual camera located in a position between the first and second cameras;

a multiview image re-projection unit for calculating a mapping pixel index of a multiview re-projection image for the virtual camera set by a user, by receiving the digital signal transmitted from the multiview image synthesizing unit, and outputting the calculated mapping pixel index; and a pixel selection unit for selecting a predetermined pixel to display an overlapping pixel of the digital signal input through the multiview image synthesizing unit, by using a signal output from the multiview image re-projection unit.

2. The apparatus as claimed in claim 1, wherein the digital signal converted by the multiview image synthesizing unit is a depth map that contains three-dimensional reconstruction data.

3. The apparatus as claimed in claim 1, wherein the multiview image synthesizing unit comprises:
   a storage portion for storing the digital image pixels of the digital signal converted from the image signal output from the first and second cameras; and
   a processing portion for outputting data of disparity by using the digital signal stored in the storage portion.

4. The apparatus as claimed in claim 1, wherein the storage portion of the multiview image re-projection unit obtains and stores an updated index value by adding a value combined according to a predetermined equation to an index of a re-projection image pixel in the previous step by using two integer numbers to represent the position of a virtual camera on a virtual line between the first and second cameras.

5. The apparatus as claimed in claim 1, wherein a depth map of the image signals output from the first and second cameras is used to obtain an image by the virtual camera located at an arbitrary position between the two images obtained from the first and second cameras.

6. The apparatus as claimed in claim 1, wherein the multiview image re-projection unit comprises:
   a first control portion for outputting a predetermined control signal by receiving the digital signal transmitted from the multiview image synthesizing unit;
   a coding portion for converting the second input signal of the user to a positive or negative number according to a predetermined control signal of the first control portion;
   a first zero portion for converting the second input signal of the user coded by the coding portion to "0" according to a predetermined control signal of the first control portion;
   a shift register portion for converting the first input signal of the user to "½" according to a predetermined control signal of the first control portion;
   a second zero portion for converting a value output from the shift register portion to "0" according to a predetermined control signal of the first control portion;
   a first sum portion for adding a signal output from the second zero portion of the first input signal to a signal output from the first zero portion of the second input signal and outputting the added value as a difference value of a mapped re-projection image index;
   a second sum portion for adding the difference value of an index output from the first sum portion to an index of a re-projection image and outputting an updated index value; and
   a register portion for storing the updated index value output from the second sum portion.

7. The apparatus as claimed in claim 1, wherein the multiview image re-projection unit uses a predetermined number (N) of left image pixels per scan line, a predetermined number (N) of right image pixels, a center-referenced depth map containing 2× predetermined number (N)+1 pixels, and an arbitrary virtual camera reference image containing (a user's first input signal 1× predetermined number (N)+1) pixels.

8. The apparatus as claimed in claim 1, wherein the pixel selection unit comprises:
   a first pixel buffer portion for storing a predetermined number (N) of scan line pixels input from the fist camera;
   a first pixel pointer portion for storing an index of the first pixel buffer portion where a left image pixel to be mapped is stored;
   a second pixel buffer portion for storing a predetermined number (N) scan line pixels input from the second camera;
   a second pixel pointer portion for storing an index of the second pixel buffer portion where a right image pixel to be mapped is stored;
   a second control portion for increasing an index of each of the first and second pixel pointer portions with respect to a difference value ($\Delta d_i$) of disparity which is input; and
   an output portion for outputting a pixel of an image of an arbitrary virtual camera.

9. The apparatus as claimed in claim 8, wherein the output portion generates a pixel of a re-projection image by using the difference value ($\Delta d_i$) of disparity and a pixel that pixel pointers at the left and right side indicate.

10. The apparatus as claimed in claim 8, wherein the first pixel buffer portion and the second pixel buffer portion are initialized when a pixel of a scan line is processed by the processing portion of the multiview image synthesizing unit.

* * * * *

UNITED STATES PATENT AND TRADEMARK OFFICE
CERTIFICATE OF CORRECTION

PATENT NO. : 6,903,735 B2 Page 1 of 1
APPLICATION NO. : 10/294681
DATED : June 7, 2005
INVENTOR(S) : Hong Jeong It is certified that error appears in the above-identified patent and that said Letters Patent is hereby corrected as shown below:

**Title page Item (*) Notice**

Subject to any disclaimer, the term of this patent is extended or adjusted under 35 U.S.C. 154(b) by 116 days.

SHOULD READ

Subject to any disclaimer, the term of this patent is extended or adjusted under 35 U.S.C. 154 (b) by 363 days.

Signed and Sealed this

Sixth Day of January, 2009

JON W. DUDAS
*Director of the United States Patent and Trademark Office*